(12) United States Patent
Mizukoshi et al.

(10) Patent No.: US 8,107,269 B2
(45) Date of Patent: Jan. 31, 2012

(54) POWER CONVERTER

(75) Inventors: Yukio Mizukoshi, Machida (JP); Yuki Nakajima, Yokohama (JP); Tomoya Imazu, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 448 days.

(21) Appl. No.: 12/166,104

(22) Filed: Jul. 1, 2008

(65) Prior Publication Data

US 2009/0010029 A1  Jan. 8, 2009

(30) Foreign Application Priority Data

Jul. 6, 2007 (JP) ................................. 2007-178213
Jul. 6, 2007 (JP) ................................. 2007-178216
Jun. 19, 2008 (JP) ................................. 2008-160224

(51) Int. Cl.
*H02M 7/42* (2006.01)

(52) U.S. Cl. .......................................... 363/131; 363/40

(58) Field of Classification Search .................. 363/97, 363/98, 131, 132, 40, 95
See application file for complete search history.

(56) References Cited

U.S. PATENT DOCUMENTS

| | | | | |
|---|---|---|---|---|
| 5,414,609 A | * | 5/1995 | Levran et al. | 363/17 |
| 7,518,890 B2 | * | 4/2009 | Hirota et al. | 363/34 |
| 2004/0056661 A1 | * | 3/2004 | Maeda et al. | 324/332 |

FOREIGN PATENT DOCUMENTS

| | | |
|---|---|---|
| JP | 11-196570 | 7/1999 |
| JP | 2004-254355 | 9/2004 |

OTHER PUBLICATIONS

Patent Abstracts of Japan issued in JP Publication No. 2004-254355 dated Sep. 9, 2004 (1 page).
Patent Abstracts of Japan issued in JP Publication No. 11-196570 dated Jul. 21, 1999 (1 page).
Office Action in Chinese Patent Application No. 200810135652.0, dated Sep. 14, 2010 (4 pages).

* cited by examiner

*Primary Examiner* — Gary L Laxton
(74) *Attorney, Agent, or Firm* — Osha • Liang LLP

(57) ABSTRACT

An apparatus to convert a direct current to an alternating current includes a power module disposed between an input terminal of the direct current and output terminal of the alternating current, the power module comprising an on/off switch element, a first smoothing condenser connected in parallel with the power module, a second smoothing condenser connected in parallel with the power module, the second smoothing condenser comprising an electrostatic capacity less than the first smoothing condenser, a first wiring connecting the power module and the first smoothing condenser, and a second wiring connecting the power module and the second smoothing condenser, the second wiring comprising an inductance greater than the first wiring.

17 Claims, 11 Drawing Sheets

(a)

(b)

POWER CONVERTER

CROSS-REFERENCE TO RELATED APPLICATIONS

The present application claims priority from Japanese Patent Application No. 2007-178213, filed Jul. 6, 2007, Japanese Patent Application No. 2007-178216 Filed on Jul. 6, 2007, and Japanese Patent Application No. 2008-160224 Filed on Jun. 19, 2008. The contents of all three priority applications are hereby incorporated by reference in their entirety.

BACKGROUND OF THE DISCLOSURE

1. Field of the Disclosure

The present disclosure relates to a power converter comprising smoothing condensers which are connected in parallel and have different characteristics from each other.

2. Description of the Related Art

Japanese Laid-Open Patent Publication No. 2004-254355 discloses a power converter of a DC-AC inverter, wherein smoothing condensers comprise multiple condensers, and wherein an aluminum electrolytic condenser and a snubber condenser having a film condenser or ceramic condenser are connected in parallel.

According to Publication, the physical volume of the entire smoothing condensers is set to be smaller by reducing the capacity of the aluminum electrolytic condenser, i.e., by allowing the low frequency ripple current to be absorbed by the aluminum electrolytic condenser and the high frequency ripple current to be absorbed by the film condenser or ceramic condenser.

When adopting the smoothing condensers as multiple condensers, the entire physical volume of the smoothing condensers may be set to be small. However, in case of utilizing the smoothing condensers by merely combining the two types of condensers with different characteristics, it is highly possible that a resonance will be generated due to the relationship between an electrostatic capacity and ESL (equivalent series inductance) in each condenser connected in parallel and inductance of wiring for connecting the condensers. If the resonance is generated between two condensers connected in parallel, because resonance current flows between the condensers, the resonance current due to the resonance generation would be added when performing an original smoothing operation to thereby cause an increase in the ripple current.

In this regard, when using the power converter for high power, it may be necessary to increase the ripple current so as to withstand against the increased amount of the ripple current. This causes the smoothing condenser to be oversized. Thus, miniaturization becomes difficult.

SUMMARY OF THE CLAIMED SUBJECT MATTER

In one aspect, the present disclosure relates to an apparatus to convert a direct current to an alternating current including a power module disposed between an input terminal of the direct current and output terminal of the alternating current, the power module comprising an on/off switch element, a first smoothing condenser connected in parallel with the power module, a second smoothing condenser connected in parallel with the power module, the second smoothing condenser comprising an electrostatic capacity less than the first smoothing condenser, a first wiring connecting the power module and the first smoothing condenser, and a second wiring connecting the power module and the second smoothing condenser, the second wiring comprising an inductance greater than the first wiring.

In another aspect, the present disclosure relates to an apparatus to convert a direct current to an alternating current including a power module disposed between an input terminal of the direct current and output terminal of the alternating current, the power module comprising an on/off switching means, a first condenser means connected in parallel with the power module, a second condenser means connected in parallel with the power module, the second condenser means comprising an electrostatic capacity less than the first condenser means, a first wiring means connecting the power module and the first condenser means, and a second wiring means connecting the power module and the second condenser means, the second wiring means comprising an inductance greater than the first wiring means.

In another aspect, the present disclosure relates to a method to convert a direct current to an alternating current includes connecting an on/off switching power module between an input of the direct current and an output of the alternating current, connecting a first smoothing condenser in parallel with the switching power module, connecting a second smoothing condenser in parallel with the switching power module, providing the second smoothing condenser with an electrostatic capacity less than that of the first smoothing condenser, and providing wiring to connect the switching power module with the second smoothing condenser that comprises an inductance greater than wiring provided to connect the switching power module with the first smoothing condenser.

BRIEF DESCRIPTION OF DRAWINGS

Features of the present disclosure will become more apparent from the following description in conjunction with the accompanying drawings.

DETAILED DESCRIPTION

Hereinafter, exemplary embodiments of the present disclosure will be explained with reference to the accompanying drawings.

First Exemplary Embodiment

Figure 1:
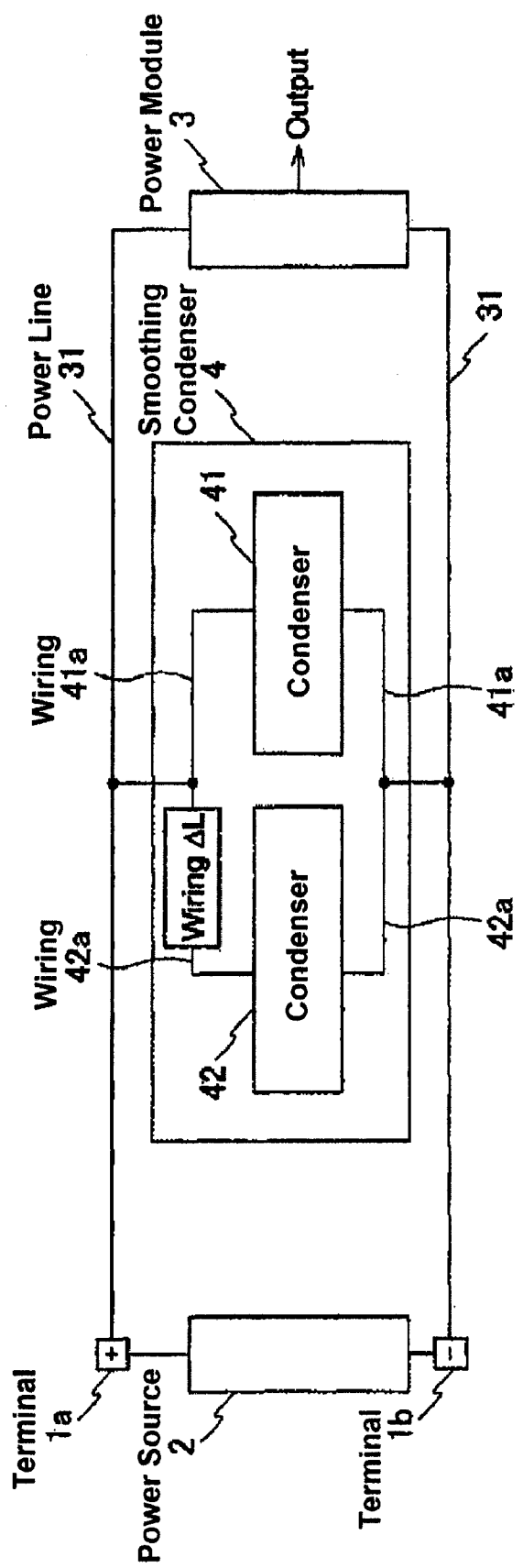
FIG. 1 shows a power converter in accordance with a first exemplary embodiment of the present disclosure.

FIG. 1 shows a power converter in accordance with a first exemplary embodiment of the present disclosure. The power converter shown includes a direct current power source 2 connected between input terminals 1a {positive (+)} and 1b {negative (−)}, a power module 3, which may include switching elements for the power such as IGBT (Insulated Gate Bipolar Transistor), connected to the direct current power source 2, and a smoothing condenser 4 connected to the power module 3 in parallel. The direct current power source 2, the power module 3 and the smoothing condenser 4 are shown connected to each other by a power line 31.

The power module 3 may include, for example, a semiconductor switching element and controls to convert a direct current power supplied from the direct current power source 2 into an alternating current power and output. The power module 3 may be driven according to a carrier frequency "fc" in several kHz to execute a power converting operation. Further, the carrier frequency in the first exemplary embodiment may be set to be about 5 kHz.

The smoothing condenser 4 may include a first smoothing condenser 41 and second smoothing condenser 42, which may be connected in parallel and may have different characteristics. Each of the first and second smoothing condensers may also be a set of the condensers, which may be connected in parallel or series and may have the same characteristics.

Further, the first smoothing condenser 41 and the second smoothing condenser 42 are shown connected to the power line 31 by using a wiring 41a of the first smoothing condenser 41 and a wiring 42a of the second smoothing condenser 42. The first smoothing condenser 41 may be arranged closer around the power module 3 compared to the second smoothing condenser 42.

Generally, an aluminum electrolytic condenser used as the first smoothing condenser 41 may have a large electrostatic capacity per volume. Thus, when using, for example, a high power inverter requiring a large electrostatic capacity as the power module, the aluminum electrolytic condenser may be suitable in terms of reducing the volume of the condenser.

An impedance of the aluminum electrolytic condenser tends to increase at high frequencies. For an inverter for performing a high speed switching, a high frequency ripple current may be generated. Because it may be necessary to absorb the high frequency ripple current (which may include a high-order harmonic component), the aluminum electrolytic condenser with a large volume may be used at the high frequency area wherein a higher impedance is obtained.

Consequently, when using the aluminum electrolytic condenser as a smoothing condenser of an inverter with high power and high speed switching, the volume of the smoothing condenser may increase so as to absorb the ripple current.

On the other hand, a ceramic condenser used as the second smoothing condenser 42 may have an electrostatic capacity per volume smaller than the aluminum electrolytic condenser. As such, when using the ceramic condenser in the high power inverter requiring a large electrostatic capacity, the volume of the condenser may become greater. Further, because the electrostatic capacity per ceramic condenser is small, it may be appropriate to arrange a plurality of the ceramic condensers "in parallel" to obtain the desired electrostatic capacity. As a result, the wiring may become complicated and the volume related to the wiring may be increased.

An impedance of the ceramic condenser in the high frequency range may be lower than the aluminum electrolytic condenser. Further, because the heat radiating performance of the ceramic condenser may also be superior, the ceramic condenser may be suitable for the inverter of performing high-speed switching. This is because the high frequency ripple current may be generated so that it (including a high-order harmonic component) is absorbed with low impedance to lessen heating.

However, as discussed above, because the volume per electrostatic capacity may be small, in case of using the ceramic condenser as a smoothing condenser for the high power and high speed switching inverter, the volume of the smoothing condenser may tend to increase to secure the electrostatic capacity corresponding to the high power inverter.

Further, when adopting the smoothing condenser only with the ceramic condenser, it may be advantageous to connect about 20 to 100 ceramic condensers in parallel wherein the number of the ceramic condenser varies depending on the capacity of a single ceramic condenser, thereby causing deterioration in productivity. For example, as indicated with the volume of the condenser, compared to constituting only with the aluminum electrolytic condenser, the volume may be reduced to ¹⁄₂₀. However, when considering the volume of wiring and productivity, the advantages thereof are less.

As shown in FIG. 1, in the first exemplary embodiment, the first smoothing condenser 41 and the second smoothing condenser 42 may having different characteristics are connected in parallel. According to such constitution, for example, the electrostatic capacity corresponding to the high-power inverter may mainly be contained in the first smoothing condenser 41 (e.g., aluminum electrolytic condenser). Also, the ripple current for corresponding to the high speed switching inverter may mainly be absorbed in the second smoothing condenser 42 (e.g., ceramic condenser).

Thus, because the aluminum electrolytic condenser, which is the first smoothing condenser 41, does not require the capacity and volume to absorbing the high frequency ripple current, it may be prepared with a minimum electrostatic capacity required for corresponding to the high power inverter.

On the other hand, because the electrostatic capacity may be secured by the first smoothing condenser 41, the ceramic condenser, which is the second smoothing condenser 42, may be prepared with a minimum electrostatic capacity for absorbing the ripple current and a multiple parallel connection thereof is not required.

As such, the volume of the condenser may be reduced to about 1/30 when the condenser comprises the first smoothing condenser 41 and the second smoothing condenser 42, which are connected in parallel and which may have different characteristics, compared to when the smoothing condenser comprises only the aluminum electrolytic condenser. Further, compared to the case of constituting the smoothing condenser with only the ceramic condenser, the number of parallel connections may be greatly reduced. Further, the volume may be reduced to about 3/5 of the original volume.

Moreover, compared to the aluminum electrolytic condenser, the film condenser may be inferior in view of the ratio of electrostatic capacity to volume, but may have superior ripple current capability. Further, compared to the ceramic condenser, the film condenser may be superior in terms of the ratio of electrostatic capacity to volume, but may have inferior ripple current capability.

Thus, in the case of constituting the first smoothing condenser 41 with the aluminum electrolytic condenser and the second smoothing condenser 42 with the film condenser, the volume may be reduced as well. Also, in the case of constituting the first smoothing condenser 42 with the film condenser and the second smoothing condenser with the ceramic condenser, the volume may be reduced.

Figure 2:
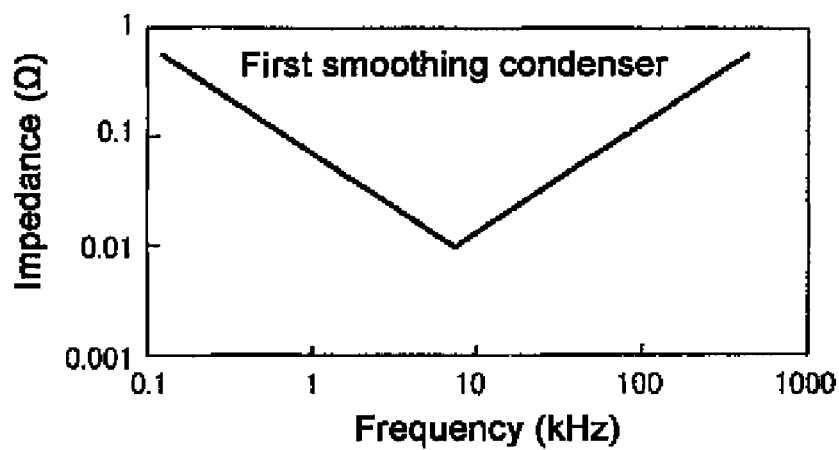
FIG. 2 shows frequency characteristics of impedance at each smoothing condenser in accordance with the first exemplary embodiment of the present disclosure.
Figure 2:
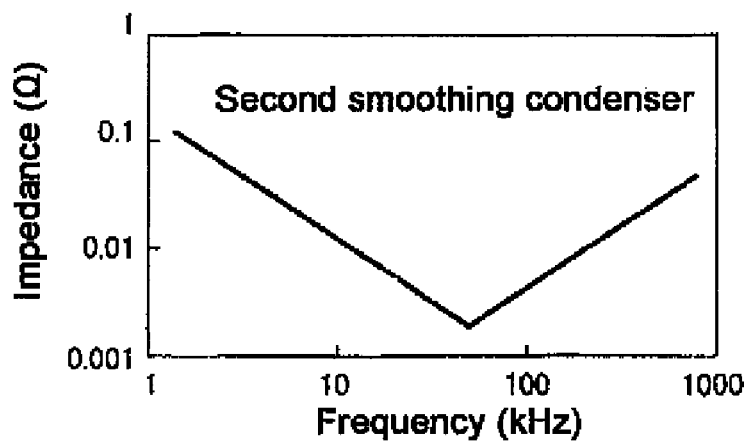

From the above differences in characteristic, the first smoothing condenser 41 and the second smoothing condenser 42 may have a different frequency characteristics of impedance from each other. As such, for example, the first smoothing condenser 41 may have the frequency characteristic depicted in FIG. 2($a$), while the second smoothing condenser has the frequency characteristic depicted in FIG. 2($b$).

The first smoothing condenser 41 having such a frequency characteristic may comprise the aluminum electrolytic condenser, while the second smoothing condenser 42 may comprise the ceramic condenser.

Referring back to FIG. 1, a magnitude relation of the electrostatic capacity between the first smoothing condenser 41 and the second smoothing condenser 42 may be set such that an electrostatic capacity C2 of the second smoothing condenser 42 is smaller than an electrostatic capacity C1 of the first smoothing condenser 41 (i.e., C1>C2). This may result in lessening the volume of the smoothing condenser 4, as mentioned above. To utilize the volume-electrostatic capacity efficiency of the first smoothing condenser 41, the volume advantage may easily be obtainable as an inevitable consequence when the capacity of the first smoothing condenser 41 is set to be larger.

The inductance of the first smoothing condenser 41 and the second smoothing condenser 42 may be set as explained below. When the equivalent serial inductance of the first smoothing condenser 41 is set as ESL1, the equivalent serial inductance of the second smoothing condenser 42 may be set as ESL2, the inductance of the wiring for connecting the power module 3 and the first smoothing condenser 41 is set as H1, and the inductance of the wiring for connecting the power module 3 and the second smoothing condenser 42 may be set at H2. The wiring inductance H2 of the second smoothing condenser 42 viewed from the power module 3 may be set to become greater than the wiring inductance H1 of the first smoothing condenser 41 (H1<H2). Specifically, as shown in FIG. 1, the wiring inductance ΔL may be added.

A method to add the wiring inductance ΔL to the wiring 42$a$ of the second smoothing condenser 42 may include establishing a wiring length thereof to be longer than the wiring 41$a$ of the first smoothing condenser 41. However, because such an establishment of elongating the wiring increases the direct current resistance component as well, it may be possible to increase only the inductance component by adjusting the thickness and shape of the wiring.

Figure 3:
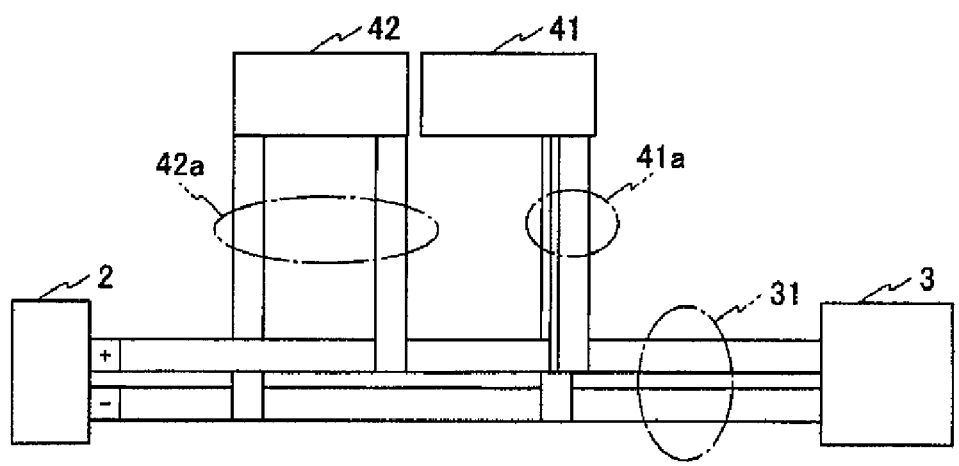
FIG. 3 shows a wiring arrangement of the smoothing condenser in accordance with the first exemplary embodiment of the present disclosure.

In the first exemplary embodiment, as shown in FIG. 3 illustrating an image of a wiring layout, to adjust only the wiring inductance ΔL, a distance of the wiring 41$a$ of the first smoothing condenser 41 may be equidistant to a distance of the wiring 42$a$ of the second smoothing condenser 42. Further, the positive (+) side wiring connected to the input terminal 1$a$ side {positive (+) side} and the negative (−) side wiring connected to the input terminal 1$b$ side {negative (−) side} of the direct current power source 2 may be arranged to overlap with each other such that the wiring inductance of the inductance related to the first smoothing condenser 41 becomes cancelled. Because such constitution of overlapping the wirings is generally used in a common inverter or condenser, details thereof will be omitted herein. However, because a magnetic field of both sides may be cancelled by overlapping the wiring, it is possible to reduce the impedance at the high frequency area.

On the other hand, the wiring 42$a$ of the second smoothing condenser 42 may be arranged to be parallel without overlapping. That is, because a cancellation effect of the magnetic field may not be operated compared to the wiring 41$a$ of the first smoothing condenser 41, the wiring inductance may become greater. The wiring inductance ΔL may be added by appropriately adjusting the arrangement and length of the wiring to obtain H1<H2.

Next, an operation resulting from the addition of the wiring inductance ΔL will be explained with reference to FIGS. 4 and 5.

Figure 4:
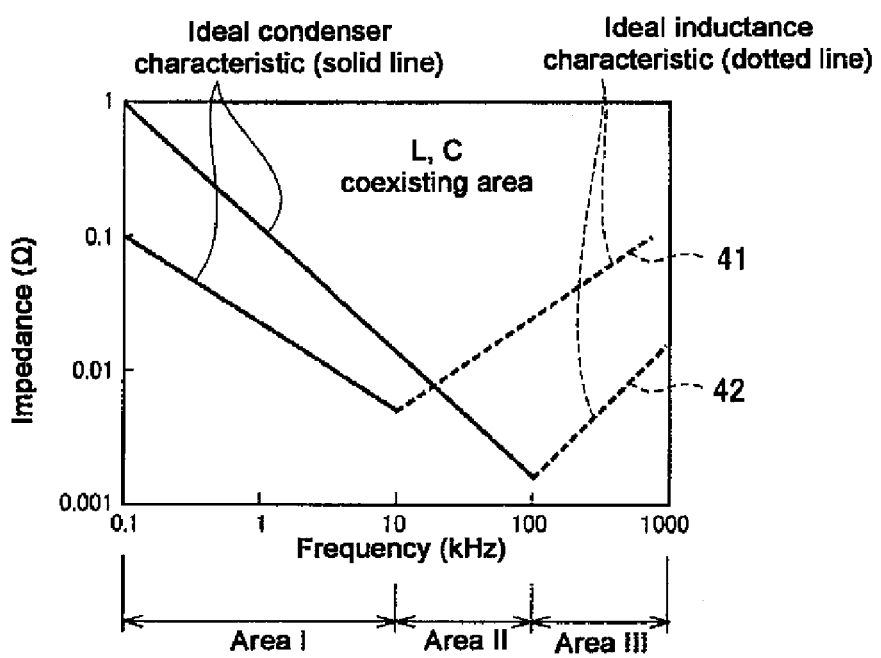
FIG. 4 shows ideal frequency characteristics of impedance at each smoothing condenser in accordance with the first exemplary embodiment of the present disclosure.

FIG. 4 is a schematic view depicting frequency characteristics of the first smoothing condenser 41 and the second smoothing condenser (i.e., illustrating ideal characteristics). As shown in FIG. 4, the impedance of the first smoothing condenser I may be decreased according to the electrostatic capacity as the frequency of the current increases. In the ideal characteristic, it may be reduced to "0" in such a state. However, because ESL exists in the condenser as the inductance component, the impedance may tend to increase as the frequency of the current increases. That is, at a particular frequency (magnetic resonance frequency), the impedance characteristic wherein the condenser component is dominant may be changed to the impedance characteristic wherein the inductance component is dominant. Such tendency may be the same as in the second smoothing condenser 42, although the characteristics thereof may differ from that of the first smoothing condenser 41.

In FIG. 4, an area wherein the condenser component is dominant is indicated with a solid line, whereas an area wherein the inductance component is dominant is indicated with a dotted line. Upon comparing the characteristics of the condensers having different characteristics in FIG. 4, the following areas exist: a frequency area wherein the condenser component is dominant in the characteristics of both the first and second smoothing condensers (i.e., Area I: both condensers are indicated with the solid line); a frequency area wherein the condenser component and the inductance component are dominant in the characteristics of both the first and second smoothing condensers (i.e., Area II: both condensers are indicated with the solid line and the dotted line); and a frequency area wherein the inductance component is dominant in the characteristics of both the first and second smoothing condensers (i.e., Area III: both condensers are indicated with the dotted line).

At this time, because both condensers are either in a parallel connection with the condenser C or a parallel connection with the inductance L in Areas I and III, the synthetic impedance of combining both condensers is indicated as a mere synthetic impedance. However, the impedance may become a parallel connection of the condenser C and the inductance L in Area II.

The parallel connection of the condenser C and the inductance L may form a so-called "resonance" circuit. At a resonant point of the resonance circuit, the synthetic impedance may be unlimited wherein there is no resistance of the direct current component. However, because the resistance in the direct current component may be the same as ESR or the wiring resistance of the first smoothing condenser 41 or the second smoothing condenser 42, this synthetic impedance may be absorbed by such a resistance so that the synthetic impedance cannot be practically unlimited. However, the synthetic impedance may become greater than the frequency prior to or after the absorption.

Figure 5:
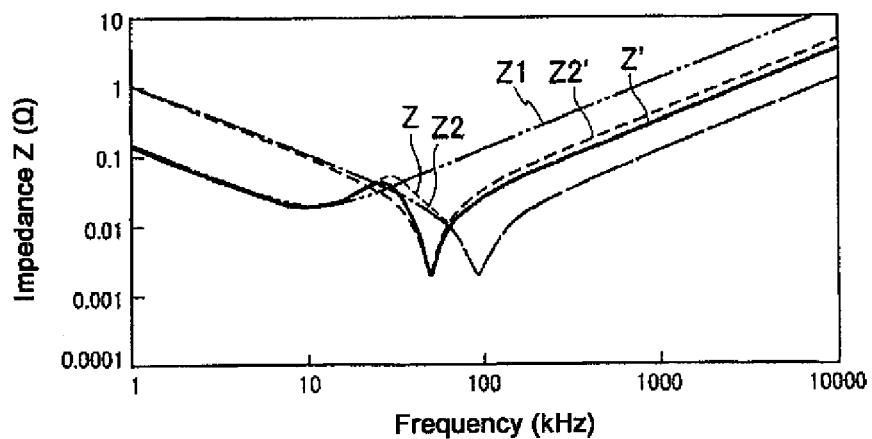
FIG. 5 shows frequency characteristics of impedance at each smoothing condenser and multiple condenser in accordance with the first exemplary embodiment of the present disclosure.

Frequency characteristics shown in FIG. 5 illustrate a result of simulations in values of each quantity as follows:

Electrostatic capacity C1 of the first smoothing condenser 41: 1000 μF;

ESL (ESL1) of the first smoothing condenser 41: 200 nH;

Equivalent serial resistance (ESR1) of the first smoothing condenser 41: 20 mΩ;

Electrostatic capacity C2 of the second smoothing condenser 42: 150 μIF;

ESL (ESL2) of the second smoothing condenser 42: 20 nH;

Equivalent serial resistance (ESR2) of the second smoothing condenser 42: 2 mL;

and Inductance difference ΔL (H2−H1): 50 nH.

In FIG. 5, when there is no inductance difference ΔL (H2−H1) (prior to the adjustment as in the prior art), the impedance of the first smoothing condenser 41 may be set as Z1, the impedance of the second smoothing condenser 42 may be set as Z2, and the synthetic impedance of both condensers may be set as Z. On the other hand, when there is an inductance difference ΔL (H2−H1) (after the adjustment in the present embodiment), the impedance of the first smoothing condenser 41 is set as Z1', the impedance of the second smoothing condenser 42 is set as Z2', and the synthetic impedance of both condensers may be set as Z'.

As may be understood from FIG. 5, when there is no inductance difference (prior to the adjustment), the synthetic impedance may be increased by the resonance in an area corresponding to Area II as discussed above. When there is an inductance difference (after the adjustment), a peak value of the synthetic impedance may be decreased. This is because the resonance frequency of the first smoothing condenser 41 and the second smoothing condenser 42 may be close to each other by adding the inductance difference to the second smoothing condenser 42.

The peak value of the synthetic impedance may be decreased as it is set that the impedance of both condensers may become lower at the frequency, which may become a parallel resonance frequency (i.e., impedance is unlimited). Because the impedance becomes unlimited at the parallel resonance frequency, the resonance may be attenuated by the direct current resistance component. However, the energy of the resonance may be attenuated by decreasing the amount of energy of generating the resonance as well.

That is, because the energy of the resonance may be current based on the energy accumulated in the condenser component and inductance component, in order to lessen the amount of energy at the time of reaching the resonance, the impedance of the first and second smoothing condensers may be suppressed to be smaller at the parallel resonance frequency.

More specifically, each impedance of the first and second smoothing condensers may become a minimum at a serial resonance frequency (frequency at which the area wherein the condenser component is dominant is switched to the area wherein the inductance component is dominant).

Thus, if the serial resonance frequencies of both condensers are adjusted to be closer, then the area of the first and second smoothing condensers with low impedance inevitably may become the resonance area. That is, if the serial resonance frequencies of both condensers become closer, because the area of both condensers with the minimum impedance component becomes closer to the parallel resonance frequency, the impedance of the first and second smoothing condensers at the parallel resonance frequency may be decreased.

In the first exemplary embodiment, the area wherein the inductance component is dominant may be broadened by adding the wiring inductance ΔL to the second smoothing condenser 42. This is so that the serial resonance frequency of the second smoothing condenser 42 may be decreased accordingly. In this regard, it may be possible to make the serial resonance frequency of the second smoothing condenser 42 to become closer to the serial resonance frequency of the first smoothing condenser 41.

To explain the phenomena shown in FIG. 5 in more detail, the serial resonance frequency f1 of the first smoothing condenser 41 and the serial resonance frequency f2 of the second smoothing condenser 42 may be indicated as the following formulas.

$$f1=1/\{2\times\pi\times(C1\times L1)^{1/2}\}$$

$$f2=1/\{2\times\pi\times(C2\times L2)^{1/2}\} \quad \text{[Formula 1]}$$

Further, the parallel resonance frequency f3 of the first smoothing condenser 41 and the second smoothing condenser 42, which are connected in parallel, may be indicated as the following formula.

$$f3=\tfrac{1}{2}\times\pi\times(C1\times C2)^{1/2}/\{(L1+L2)\times C1\times C2\}^{1/2} \quad \text{[Formula 2]}$$

Thus, each of the serial resonance frequencies f1 and f2 and the parallel resonance frequency f3 may depend on a value of multiplying the corresponding electrostatic capacities C1 and C2 and the inductance L1 and L2 of the smoothing condensers (C1×L1, C2×L2).

That is, in order to secure the condenser capacity, in the present embodiment wherein C1 is increased and C2 is decreased (C1>C2), increasing L2 leads to decreasing the difference between (C1×L1) and (C2×L2).

Figure 6:
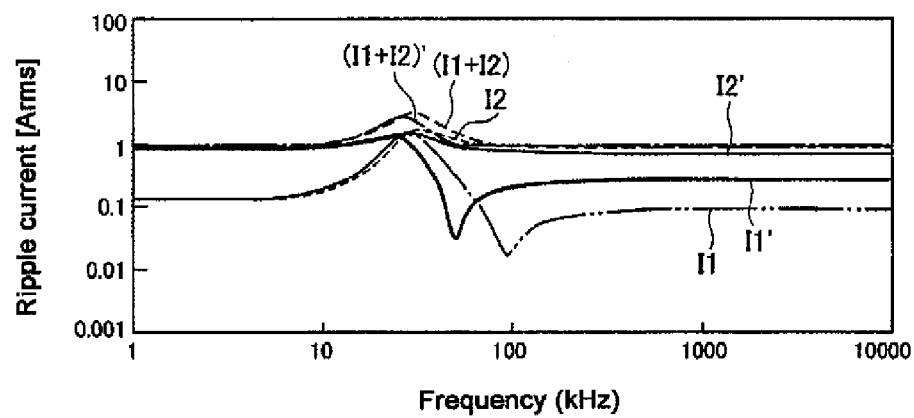
FIG. 6 shows frequency characteristics of ripple current at each smoothing condenser and multiple condenser in accordance with the first exemplary embodiment of the present disclosure.

Further, in the first exemplary embodiment as shown in FIG. 6, compared to a case without the inductance ΔL, the ripple current at the parallel resonance frequency may be reduced. As such, the heating may be reduced to thereby achieve the miniaturization of the smoothing condenser 4.

Next, the difference of multiplying the electrostatic capacity and the inductance of each smoothing condenser (L1×C1, L2×C2), connected in parallel, in the prior art such as Patent Document 1 and the first exemplary embodiment will be explained.

In the prior art, compared to the electrostatic capacity C11 and inductance L11 of one smoothing condenser, which may be connected in parallel, both the electrostatic capacity 22 and inductance L22 of the other smoothing condenser may be set to be smaller. This is because it may be intended to reduce the loss caused by the ripple current by decreasing the inductance L22 as much as possible so that the other smoothing condenser may absorb the ripple current. Thus, a multiplication of the electrostatic capacity and inductance of one smoothing condenser (C11×L11) may be set to be much greater than a multiplication of the electrostatic capacity and inductance of the other smoothing condenser (C22×L22), i.e., (C11×L11>>C22×L22).

On the other hand, the electrostatic capacity C1 of the first smoothing condenser 41 may be set to be greater than the electrostatic capacity C2 of the second smoothing condenser 42 (C1>C2), whereas the wiring inductance H2 of the second smoothing condenser 42 may be set to be greater than the wiring inductance H1 of the first smoothing condenser 41 (H1<H2).

Thus, comparing the absolute value (|C11×L11−C22×L22|) of the difference (ΔCL1122) between the multiplication (C11×L11) of the electrostatic capacity and inductance of the smoothing condenser at one side and the multiplication (C22×L22) of the electrostatic capacity and inductance of the smoothing condenser at the other side in the prior art and the absolute value (|C1×L1−C2×L2|) of the difference (ΔCL12) between the multiplication (C1×L1) of the electrostatic capacity C1 and inductance L1 of the first smoothing condenser 41 and the multiplication (C2×2) of the electrostatic capacity C2 and inductance L2 of the second smoothing condenser 42 in the first exemplary embodiment, the difference (ΔCL 1122) in the prior art may be greater than the difference (ΔCLL12) in the first exemplary embodiment (ΔCL1122>ΔCL12).

As such, the difference between the serial resonance frequency f1 of the first smoothing condenser 41 and the serial resonance frequency f2 of the second smoothing condenser 42 in the first exemplary embodiment may become smaller than that in the prior art. This is so that the impedance at the parallel resonance frequency f3 may become smaller as well.

Because the resonance current generated between the smoothing condensers, connected in parallel, may be reduced compared to the prior art, the ripple current of the first smoothing condenser 41 may be reduced. Thus, it may become possible to miniaturize the constitution of the first smoothing condenser 41 comprising the aluminum electrolytic condenser with low ripple current withstand per unit volume.

Also, any relationship may be used within a range in which an advantage of the smoothing condenser in view of the volume is obtained. That is, when it is C1=C2, the difference between C1×L1 and C2×L2 may become the smallest, but the advantage in view of the volume may become reduced. Moreover, when it becomes C1<C2, the advantage in view of the volume may further be reduced. Thus, in the range of C>C2, the advantage in view of the volume may be obtained. In addition, because ESL of the second smoothing condenser 42 may be lower than ESL of the first smoothing condenser 41, the magnetic resonance frequencies of both condensers may become closer by adding the wiring inductance ΔL.

Further, in the first exemplary embodiment, the electrostatic capacity of each condenser per entire electrostatic capacity may be set to be approximately C1=85% and C2=15%.

Second Exemplary Embodiment

Figure 7:
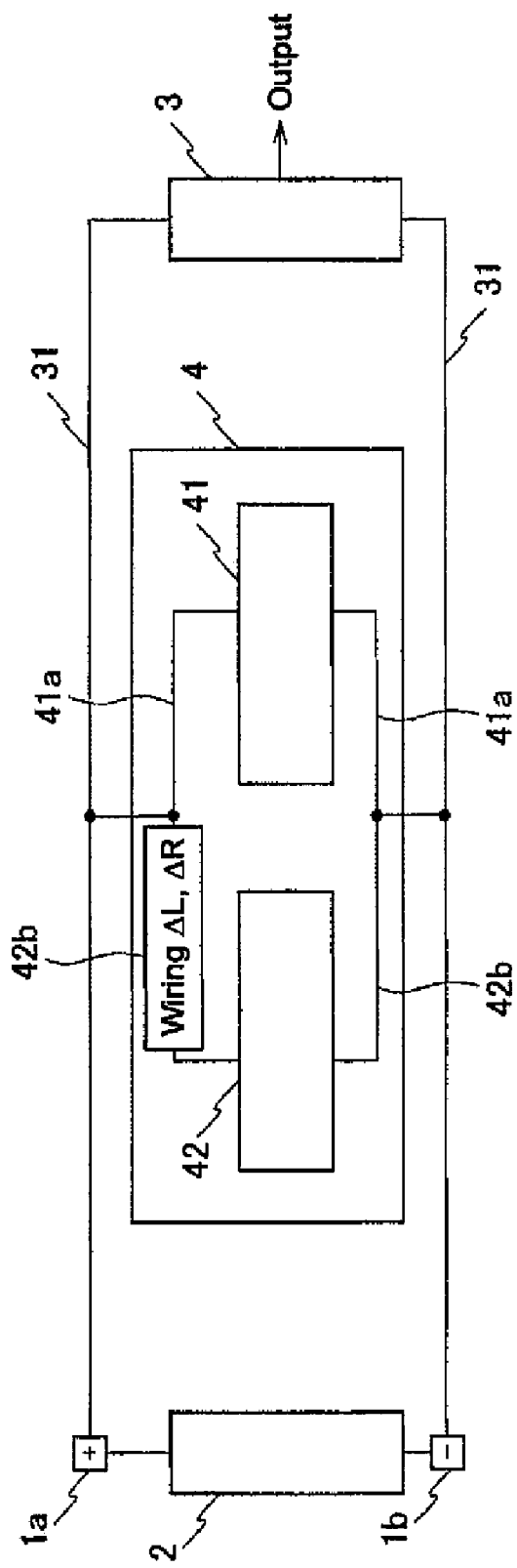
FIG. 7 shows a power converter in accordance with a second exemplary embodiment of the present disclosure.

FIG. 7 depicts a power converter in accordance with a second exemplary embodiment of the present disclosure. As explained in relation to the first exemplary embodiment, the impedance of the parallel resonance frequency of both condensers may be reduced by adding the wiring inductance ΔL to the second smoothing condenser 42 in the first exemplary embodiment.

Further, it may be desirable that the impedance at the parallel resonance frequency of the first smoothing condenser 41 and the second smoothing condenser 42, which are connected in parallel ("synthetic impedance") is set to be smaller than the synthetic impedance at a carrier frequency of the power module 3.

Figure 8:
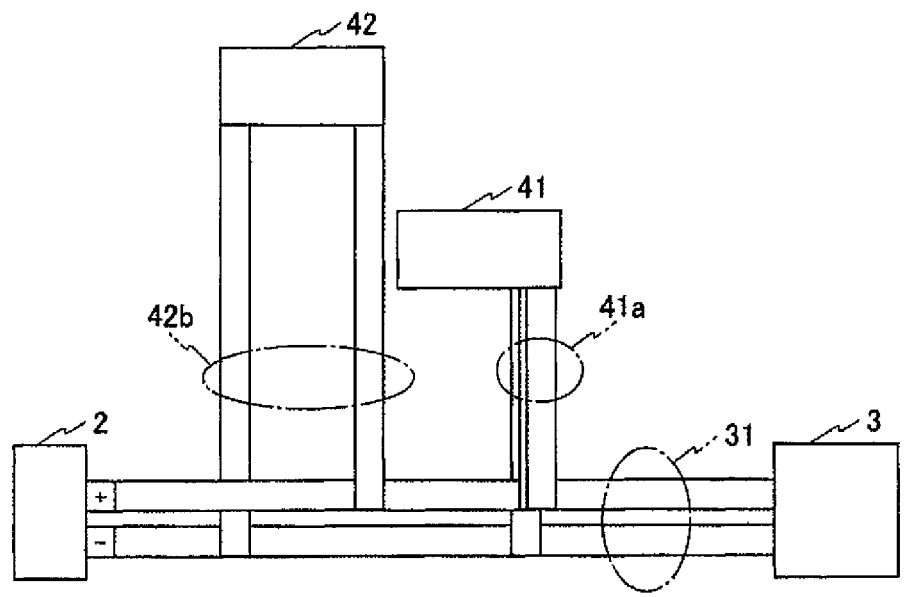
FIG. 8 shows a wiring arrangement of a smoothing condenser in accordance with the second exemplary embodiment of the present disclosure.

More specifically, it may be realized by adding a wiring resistance ΔR to the wiring 42b of the second smoothing condenser 42 (i.e., in addition to the wiring inductance ΔL). As shown in FIG. 8, such a feature may increase the resistance of the wiring 42b compared to that of the first exemplary embodiment by adding the wiring resistance ΔR by increasing the wiring length of the wiring 42b of the second smoothing condenser 42 compared to the first exemplary embodiment or thinning the wiring width.

Figure 9:
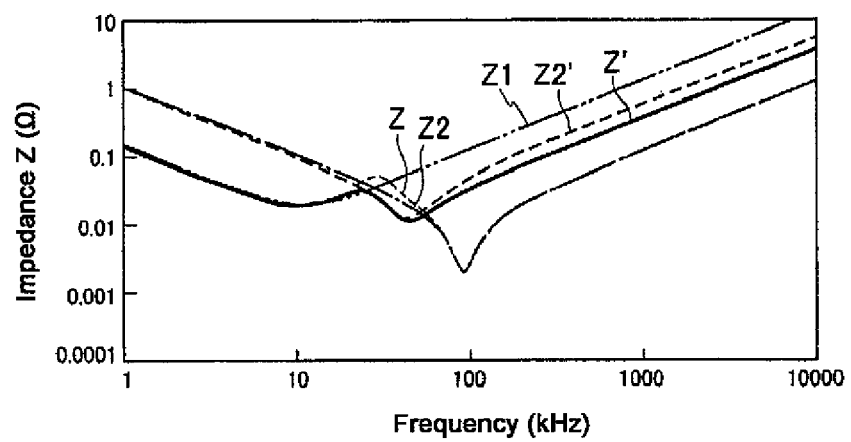
FIG. 9 shows frequency characteristics of impedance at each smoothing condenser and multiple condenser in accordance with the second exemplary embodiment of the present disclosure.

FIG. 9 depicts frequency characteristics of the impedance with regard to simulation results wherein each quantity of the first smoothing condenser 41 and the second smoothing condenser 42 is as follows. The following is an example wherein the operational current is the frequency characteristic per one ampere.

Electrostatic capacity C1 of the first smoothing condenser 41: 1000 μF

ESL (ESL1) of the first smoothing condenser 41: 200 nH

Equivalent serial resistance (ESR1) of the first smoothing condenser 41: 20 mΩ

Electrostatic capacity C2 of the second smoothing condenser 42: 150 μF

ESL (ESL2) of the second smoothing condenser 42: 20 nH

Equivalent serial resistance (ESR2) of the second smoothing condenser 42: 2 mΩ

Inductance difference ΔL (H2−H1): 50 nH

Wiring resistance difference ΔR (R2−R1): 10 mΩ

Further, with the exception of the wiring resistance difference ΔR, each quantity may be the same as shown in FIG. 5.

In FIG. 9, at the carrier frequency (fc: about 5 kHz) of the power module 3, the frequency characteristic of the impedance Z1 (fc) of the first smoothing condenser 41 may become almost the same as the frequency characteristic of the synthetic impedance Z (fc) of the first smoothing condenser 41 and the second smoothing condenser 42, which may be connected in parallel. Also, the serial resonance frequency f1 of the first smoothing condenser, the serial resonance frequency f2 of the second smoothing condenser 42 and the parallel resonance frequency f3 of the first smoothing condenser 41 and the second smoothing condenser 42 may be set as the frequency band equal to or more than 10 kHz, which is higher than the carrier frequency fc. Further, a vicinity of the parallel resonance frequency f3 may be indicated by the high-order harmonic component of the carrier frequency fc and the so-called high frequency ripple current may be generated therein.

Here, the impedance Z1 of the first smoothing condenser 41, the impedance Z2 of the second smoothing condenser 42 and the synthetic impedance Z of the first smoothing condenser 41 and the second smoothing condenser 42 may be indicated as the following formulas.

$$Z1 = \{ESR1^2 + (\omega ESL1 - 1/\omega/C1)^2\}^{1/2};$$

$$Z2 = \{R2^2 + (\omega L2 - 1/\omega/C2)^2\}^{1/2}; \text{ and}$$

$$Z = Z1 \times Z2/(Z1+Z2), \qquad \text{[Formula 3]}$$

Where, $R2 = ESR2 + \Delta R$ and $L2 = ESL2 + \Delta L$.

In order to calculate the synthetic impedance Z (f3) at the parallel resonance frequency B of the first smoothing condenser 41 and the second smoothing condenser 42 for simplifying the calculation, the impedance Z1 of the first smoothing condenser 41, the impedance Z2 of the second smoothing condenser 42 and the total of both impedances (Z1+Z2) may be approximated as follows.

$$Z1 \approx \omega ESL1;$$

$$Z2 \approx 1/\omega/C2; \text{ and}$$

$$Z1+Z2 \approx R2+ESR1. \quad \text{[Formula 4]}$$

The synthetic impedance Z (f3) at the parallel resonance frequency may be indicated as follows based on the above Formulas 3 and 4 by using such an approximation.

$$Z(f3) \approx ESL1/C2/(R2+ESR1). \quad \text{[Formula 5]}$$

Because the impedance characteristics of the first smoothing condenser 41 and the second smoothing condenser 42, connected in parallel, may become approximately similar at the carrier frequency fc, the synthetic impedance Z (fc) at the carrier frequency fc may be approximated to the impedance Z1 (fc) of the first smoothing condenser 41 at the carrier frequency fc indicated as follows.

$$Z(fc) \approx Z1(fc) \approx 1/\omega cC1, \quad \text{[Formula 6]}$$

where $\omega c=2\pi fc$.

Thus, in order to establish the synthetic impedance Z (f3) at the parallel resonance frequency of the first smoothing condenser 41 and the second smoothing condenser 42, connected in parallel, to be smaller than the synthetic impedance Z (fc) at the carrier frequency fc of the power module 3 (Z(f3)<Z (fc)), it may be realized by establishing the following relationship based on Formulas 5 and 6.

$$\omega cC1 \times ESL1 < C2(R2+ESR1) \quad \text{[Formula 7]}$$

As such, the synthetic impedance at the parallel resonance frequency may be suppressed by establishing the electrostatic capacity C2 of the second smoothing condenser 42 to be smaller than the electrostatic capacity C1 of the first smoothing condenser 41 (C1>C2), establishing R2 to be large so as to become the relationship in Formula 7, and establishing the synthetic impedance Z (f3) at the parallel resonance frequency to be smaller than the synthetic impedance Z (fc) at the carrier frequency fc of the power module. As such, it may become possible to allow a voltage change at the parallel resonance frequency to be smaller than a voltage change at the carrier frequency fc of the power module 3.

Although the synthetic impedance at the parallel resonance frequency may be suppressed by adding the inductance ΔL in the first exemplary embodiment, in order to further increase the effect of suppression (particularly to allow the voltage change at the parallel resonance frequency to be smaller than the voltage change at the carrier frequency of the power module 3), it may be effective to add the resistance ΔR as well as the inductance ΔL.

Figure 10:
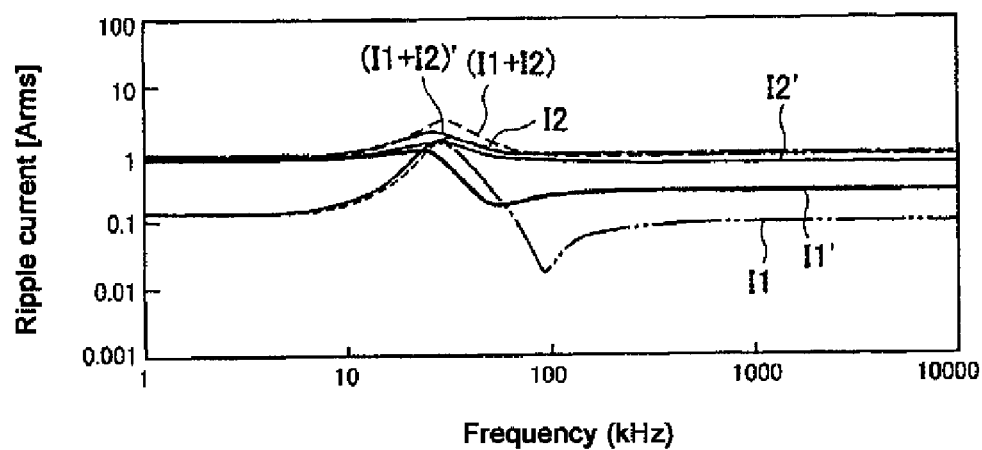
FIG. 10 shows frequency characteristics of ripple current at each smoothing condenser and multiple condenser in accordance with the second exemplary embodiment of the present disclosure.

For example, as indicated by the frequency characteristic of the ripple current shown in FIG. 10, the synthetic impedance at the parallel resonance frequency may be reduced compared to that of the first exemplary embodiment. Further, although the ripple current flowing in the first smoothing condenser 41 may be reduced, the ripple current flowing in the second smoothing condenser 42 at the higher frequency area may not be inferior to that in the first exemplary embodiment.

That is, when suppressing the synthetic impedance at the parallel resonance frequency by adding the inductance ΔL, because the characteristic of the second smoothing condenser 42 at the high frequency area may be deteriorated, the ripple current branched into the first smoothing condenser 41 at the high frequency area may be increased.

Thus, it may be possible to minimize the addition of the inductance ΔL and to make the voltage change at the parallel resonance frequency smaller than the voltage change at the carrier frequency of the power module 3 by adding the resistance ΔR. Consequently, because the pressure resistance required for the first smoothing condenser 41 may be lessened, the smoothing condenser 4 including the first smoothing condenser 41 and the second smoothing condenser 42, connected in parallel, may be prepared as the condenser with a superior high frequency characteristic. Further, it may be possible to suppress a surge voltage, which may be easily generated in the first smoothing condenser 41 having large ESL. As such, it may be possible to adopt the lower pressure resistance condenser to the first smoothing condenser 41, thereby promoting the miniaturization.

Also, when making the wiring inductance at the second smoothing condenser 42 side to be large, it may be possible to suppress the increase of synthetic impedance at the parallel resonance frequency by establishing the electrostatic capacity C1 of the first smoothing condenser 41 to be greater than the electrostatic capacity C2 of the second smoothing condenser 42 (C1>C2) and adding the resistance ΔR, wherein the synthetic impedance Z (f3) at the parallel resonance frequency may be smaller than the synthetic impedance Z (fc) at the carrier frequency fc of the power module 3. Further, it may also be possible to reduce the electrostatic capacity without deteriorating the characteristic of the second smoothing condenser 42 at the high frequency area, thereby miniaturizing the constitution.

Third Embodiment

Figure 11:
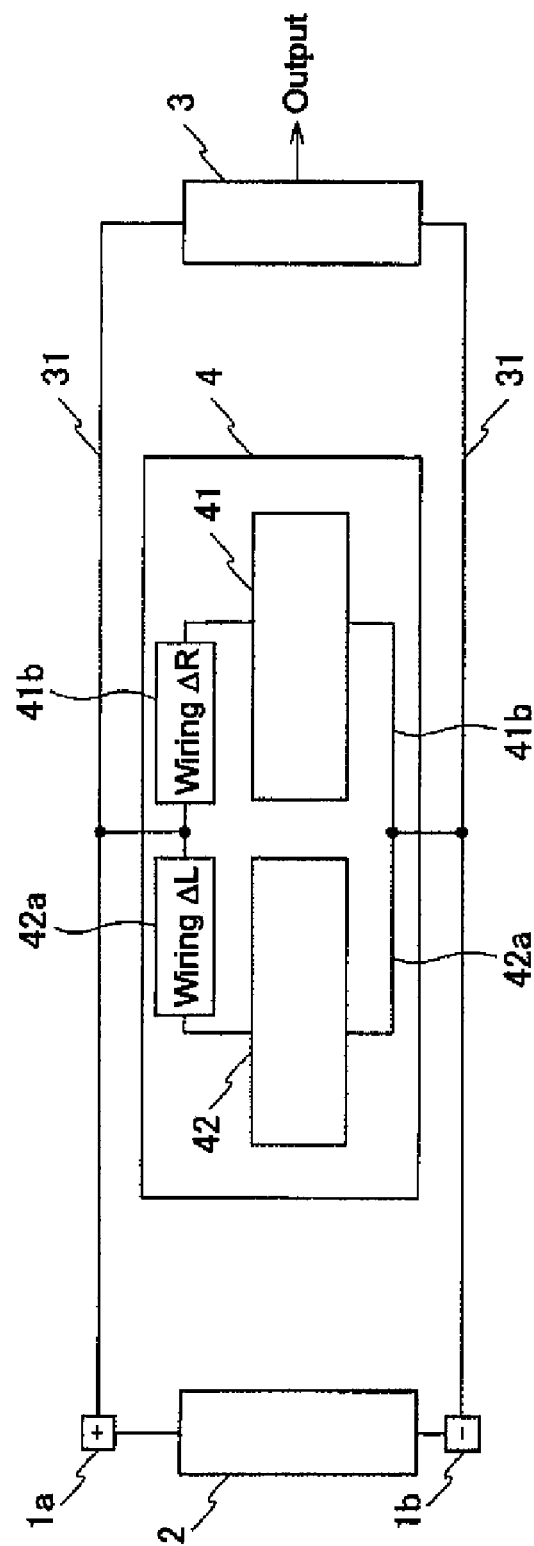
FIG. 11 shows a power converter in accordance with a third exemplary embodiment of the present disclosure.
Figure 12:
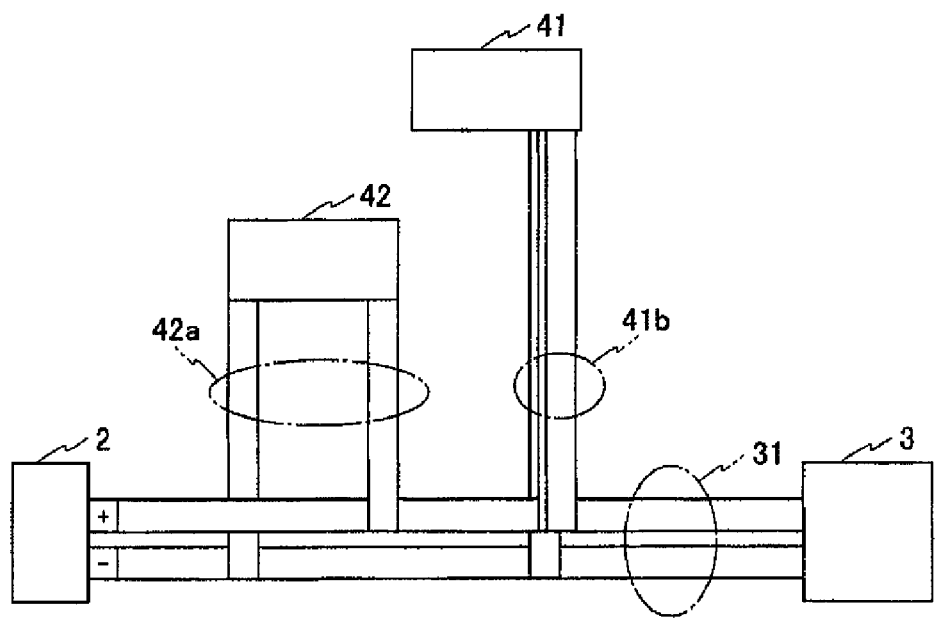
FIG. 12 shows a wiring arrangement of a smoothing condenser in accordance with the third exemplary embodiment of the present disclosure.

FIG. 11 depicts a power converter in accordance with a third exemplary embodiment of the present disclosure. As shown, the wiring inductance of the second smoothing condenser 42 may be greater than that of the first smoothing condenser 41 and the inductance difference therebetween may be ΔL in the first and second exemplary embodiments. Further, the serial resistance component of the wiring at the second smoothing condenser 42 side may be greater than that at the first smoothing condenser 41 side and the resistance difference therebetween may be ΔR in the second exemplary embodiment.

On the other hand, in the third exemplary embodiment, the wiring inductance at the second smoothing condenser 42 side may be greater than that at the first smoothing condenser 41 side and the inductance difference therebetween is ΔL. Also, the serial resistance component of the first smoothing condenser 41 may be greater than that of the second smoothing condenser 42 and the resistance difference therebetween is ΔR. Additionally, the impedance may be adjusted at the parallel resonance frequency by the relationship between the inductance difference ΔL and the resistance difference ΔR.

That is, the serial resonance frequency f1 of the first smoothing condenser 41, the serial resonance frequency f2 of the second smoothing condenser 42 and the parallel resonance frequency f3 of the first smoothing condenser 41 and second smoothing condenser 42 may be allowed to be closer {C1×ESL1≈C2×L2(=ESL2+ΔL)}. More preferably, the synthetic impedance at the parallel resonance frequency of the first smoothing condenser 41 and second smoothing condenser 42, in parallel, may be set to be smaller than the synthetic impedance at the carrier frequency of the power module 3. Such a feature may be utilized by adding the serial resistance component ΔR to the wiring 41a of the first smoothing condenser 41. For example, as shown in FIG. 11 illustrating an image of a wiring layout, the wiring length of the first smoothing condenser 41 may be set to be longer than the wiring length of the second smoothing condenser 42.

As such, even when a ratio of the wiring inductance at both smoothing condensers is approximately equal to a reciprocal ratio of the electrostatic capacity as in the first and second exemplary embodiments, the electrostatic capacity C1 of the first smoothing condenser 41 may be set to be greater than the electrostatic capacity C2 of the second smoothing condenser 42 (C1>C2). Further, the synthetic impedance Z (f3) at the parallel resonance frequency may be set to be smaller than the synthetic impedance Z (fc) at the carrier frequency of the power module 3.

Moreover, instead of the relationship indicated by Formula 7, the following relationship may be established.

$$\omega cC1 \times ESL1 << C2(R11+ESR2). \quad \text{Formula 8}$$

Here, R11 is a value of adding the wiring resistance to ESR1 of the first smoothing condenser 41.

Compared to the first and second exemplary embodiments, it may be possible to establish the synthetic impedance Z (f3) at the parallel resonance frequency to be much smaller than the synthetic impedance Z (fc) at the carrier frequency of the power module 3 by the above relationship to thereby suppress the surge voltage. Further, because the voltage changes at both smoothing condensers may be approximately the same, it may be possible to suppress the voltage change difference caused by the wiring impedance difference. As a result, because it becomes possible to adopt the low pressure resistance condenser, it may be possible to miniaturize both the first smoothing condenser 41 and the second smoothing condenser 42.

Figure 13:
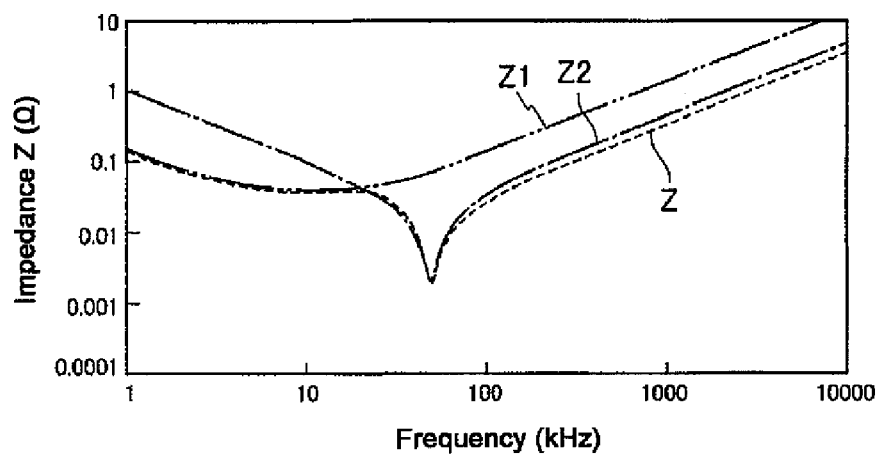
FIG. 13 shows frequency characteristics of impedance at each smoothing condenser and multiple condenser in accordance with the third exemplary embodiment of the present disclosure.
Figure 14:
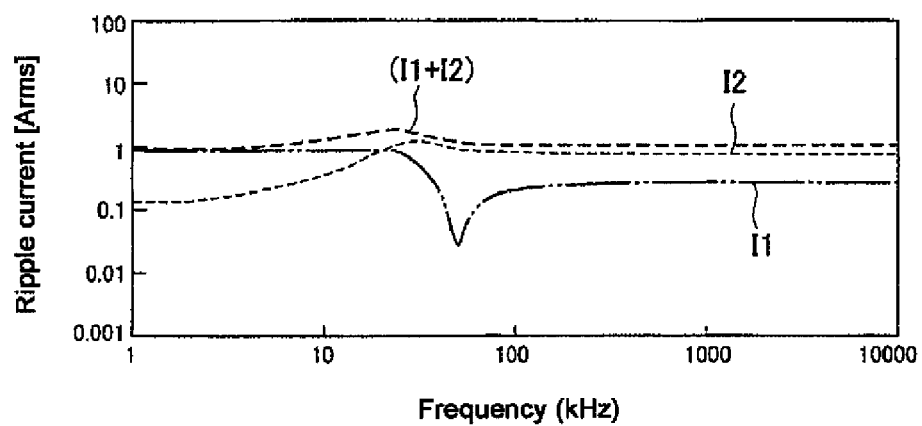
FIG. 14 shows frequency characteristics of ripple current at each smoothing condenser and multiple condenser in accordance with the third exemplary embodiment of the present disclosure.

FIGS. 13 and 14 depict an example of the impedance (operational current per one ampere) at each smoothing condenser and the frequency characteristics of the ripple current. The frequency characteristics shown in FIGS. 13 and 14 indicate a result of simulation wherein each quantity is as follows.

Electrostatic capacity C1 of the first smoothing condenser 41: 1000 μF;
ESL (ESL1) of the first smoothing condenser 41: 200 nH;
Equivalent serial resistance (ESR1) of the first smoothing condenser 41: 20 mΩ;
Electrostatic capacity C2 of the second smoothing condenser 42: 150 μF;
ESL (ESL2) of the second smoothing condenser 42: 20 nH;
Equivalent serial resistance (ESR2) of the second smoothing condenser 42: 2 mΩ;
Inductance difference ΔL (H2−H1): 50 nH; and
Wiring resistance difference ΔR (R1−R2): 10 mΩ.

As may be understood from FIG. 13, the resonance current flowing between the first smoothing condenser 41 and second smoothing condenser 42 may be suppressed by making the resonance frequencies of both smoothing condensers to be closer. Further, the total current of both condensers at the resonance frequency may be reduced. Because it may be possible to establish the synthetic impedance Z (f3) at the parallel resonance frequency to be much smaller than the synthetic impedance Z (fc) at the carrier frequency of the power module 3, the surge voltage may be suppressed.

Further, as may be understood from FIG. 14, because voltage changes in both smoothing condensers become approximately the same, it may be possible to suppress the voltage change difference caused by the wiring impedance difference. As such, because it may be possible to adopt the low pressure resistance condenser, it may be possible to miniaturize both the first smoothing condenser 41 and the second smoothing condenser 42.

Fourth Embodiment

Figure 15:
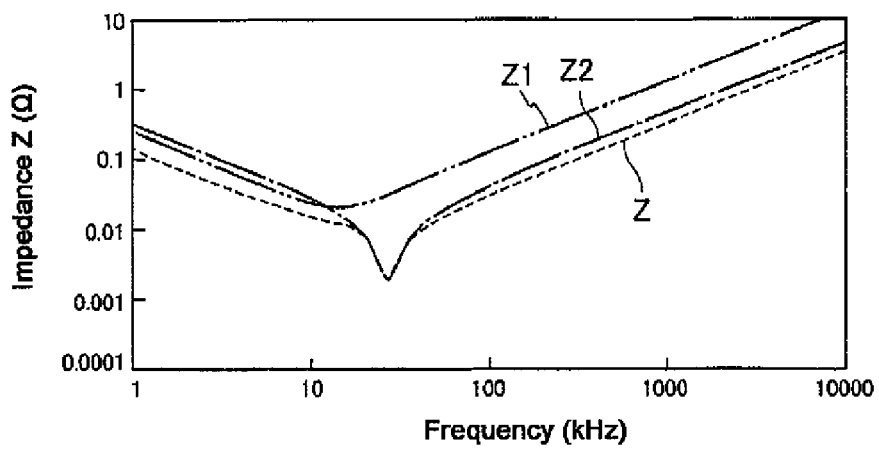
FIG. 15 shows frequency characteristics of impedance at each smoothing condenser and multiple condenser in accordance with a fourth exemplary embodiment of the present disclosure.
Figure 16:
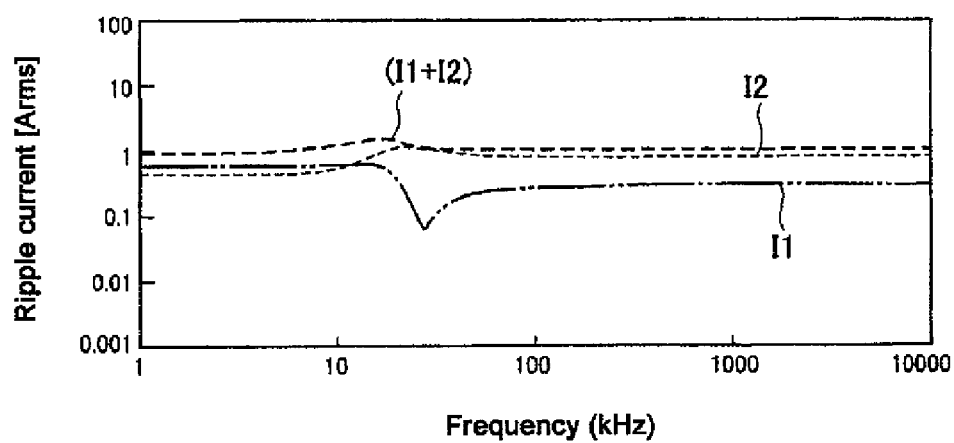
FIG. 16 shows frequency characteristics of ripple current at each smoothing condenser and multiple condenser in accordance with the fourth exemplary embodiment of the present disclosure.

Next, a fourth exemplary embodiment of the present disclosure will be explained. FIGS. 15 and 16 depict the impedance and frequency characteristics of the ripple current of the fourth exemplary embodiment. Compared to the first exemplary embodiment, the serial resonance frequency and parallel resonance frequency of the first smoothing condenser 41 and second smoothing condenser 42 may be allowed to be approximately the same in the fourth exemplary embodiment. Other than that, the other features may be the same as in the first exemplary embodiment.

That is, the magnitude relation of the inductance between the first smoothing condenser 41 and the second smoothing condenser 42 may be the same as in the first exemplary embodiment. Further, the ratio of the electrostatic capacities of the first smoothing condenser and the second smoothing condenser (C1:C2) may be changed. Also, the electrostatic capacity and inductance of each smoothing condenser and the inductance by the wiring may be adjusted and set such that the ratio of the electrostatic capacity and the ratio of the inductance (L1:L2) may become a reciprocal ratio (C1:C2≈L2:L1). That is, the multiplication of the electrostatic capacity C1 of the first smoothing condenser 41 and the inductance L1 (C1×L1) and the multiplication of the electrostatic capacity C2 of the second smoothing condenser 42 and the inductance L2 (C2×L2) may be set to be approximately the same with each other (C1×L1≈C2×L2).

As a result, as indicated in Formulas 1 and 2 of the first exemplary embodiment, it may be possible to make the serial resonance frequency f1 of the first smoothing condenser 41, the serial resonance frequency f2 of the second smoothing condenser 42 and the parallel resonance frequency f3 of the first smoothing condenser 41 and second smoothing condenser 42 to be approximately the same. Thus, because it may be possible to further reduce the resonance current between the first smoothing condenser 41 and the second smoothing condenser 42 in the fourth exemplary embodiment compared to the first exemplary embodiment, the resonance current may be reduced to a very small value.

FIG. 15 depicts an example of the frequency characteristics of the impedance (operational current per one ampere) of each smoothing condenser when the first smoothing condenser 41 and the second smoothing condenser 42 are within the electrostatic capacity and inductance difference ΔL below. The frequency characteristics shown in FIG. 15 indicate a result of simulation wherein each quantity is as follows.

Electrostatic capacity C1 of the first smoothing condenser 41: 650 μF
ESL (ESL 1) of the first smoothing condenser 41: 200 nH
Equivalent serial resistance (ESR1) of the first smoothing condenser 41: 20 mΩ
Electrostatic capacity C2 of the second smoothing condenser 42: 500 μF
ESL (ESL2) of the second smoothing condenser 42: 20 nH
Equivalent serial resistance (ESR2) of the second smoothing condenser 42: 2 mΩ
Inductance difference ΔL (H2−H1): 50 nH As may be understood from FIG. 15, it may be possible to reduce the total current of both condensers at the resonance frequency by suppressing the resonance current flowing between the first smoothing condenser 41 and the second smoothing condenser 42 by making the resonance frequencies to be approximately the same. Further, as shown in FIG. 16, because an amount of the ripple current flowing the second smoothing condenser 42 may be reduced, it may be necessary to use the first smoothing condenser having the large ripple current withstand.

Advantageously, embodiments disclosed herein provide a power converter comprising smoothing condensers having high electrostatic capacity and ripple current withstand while promoting the miniaturization thereof.

In order to accomplish the above advantages, certain embodiments of the present disclosure may be provided with a power condenser comprising a power module having a plurality of switching elements and a smoothing condenser connected to the power module, wherein: the smoothing condenser includes a first smoothing condenser and a second smoothing condenser connected in parallel; a frequency characteristic of impedance of the first smoothing condenser is different from a frequency characteristic of impedance of the second smoothing condenser; an electrostatic capacity of the first smoothing condenser is greater than an electrostatic capacity of the second smoothing condenser; and an inductance of a wiring for connecting the second smoothing condenser and the power module is greater than an inductance of a wiring for connecting the first smoothing condenser and the power module.

According to certain embodiments of the present disclosure, it may be possible to reduce the resonance current between the first smoothing condenser and the second smoothing condenser. Consequently, it may be possible to reduce the ripple current of the smoothing condenser to thereby miniaturize the smoothing condensers.

While the disclosure has been presented with respect to a limited number of exemplary embodiments, those skilled in the art, having benefit of this disclosure, will appreciate that other embodiments may be devised which do not depart from the scope of the present invention. Accordingly, the scope of the invention should be limited only by the attached claims.

What is claimed is:

1. An apparatus to convert a direct current to an alternating current, comprising:
   a power module disposed between an input terminal of the direct current and output terminal of the alternating current, the power module comprising an on/off switch element;
   a first smoothing condenser connected in parallel with the power module;
   a second smoothing condenser connected in parallel with the power module;
   the second smoothing condenser comprising an electrostatic capacity less than the first smoothing condenser;
   a first wiring connecting the power module and the first smoothing condenser; and
   a second wiring connecting the power module and the second smoothing condenser, the second wiring comprising an inductance greater than the first wiring,
   wherein the second wiring is configured such that a resonance frequency of the first condenser is substantially similar to a resonance frequency of the second condenser.

2. The apparatus of claim 1, wherein an inner inductance of the second smoothing condenser is less than an inner inductance of the first smoothing condenser.

3. The apparatus of claim 1, wherein
   a positive (+) side wiring and a negative (−) side wiring of the first wiring overlap with each other; and
   a positive (+) side wiring and a negative (−) side wiring of the second wiring do not overlap with each other.

4. The apparatus of claim 1, wherein a resistance of the second wiring is greater than a resistance of the first wiring.

5. The apparatus of claim 1, wherein a wiring length from the power module to the second smoothing condenser is longer than a wiring length from the power module to the first smoothing condenser.

6. The apparatus of claim 1, wherein the first smoothing condenser is positioned closer to the power module compared to the second smoothing condenser.

7. The apparatus of claim 1, wherein a resistance of the first wiring is greater than a resistance of the second wiring.

8. The apparatus of claim 1, wherein a wiring length from the power module to the first smoothing condenser is longer than a wiring length from the power module to the second smoothing condenser.

9. The apparatus of claim 1, wherein a synthetic impedance at a resonance frequency of the first and second smoothing condensers is smaller than a synthetic impedance at a carrier frequency of the power module.

10. The apparatus of claim 1, wherein a ratio of an electrostatic capacity of the first smoothing condenser to an electrostatic capacity of the second smoothing condenser is substantially equal to a ratio of the an inner inductance plus a wiring inductance of the second smoothing condenser to an inner inductance plus a wiring inductance of the first smoothing condenser.

11. An apparatus to convert a direct current to an alternating current, comprising:
    a power module disposed between an input terminal of the direct current and output terminal of the alternating current, the power module comprising an on/off switching means;
    a first condenser means connected in parallel with the power module;
    a second condenser means connected in parallel with the power module;
    the second condenser means comprising an electrostatic capacity less than the first condenser means;
    a first wiring means connecting the power module and the first condenser means; and
    a second wiring means connecting the power module and the second condenser means, the second wiring means comprising an inductance greater than the first wiring means,
    wherein the second wiring means is configured such that a resonance frequency of the first condenser means is substantially similar to a resonance frequency of the second condenser means.

12. The apparatus of claim 11, wherein an inner inductance of the second condenser means is less than an inner inductance of the first condenser means.

13. The apparatus of claim 11, wherein a resistance of the second wiring means is greater than a resistance of the first wiring means.

14. The apparatus of claim 11, wherein the first condenser means is positioned closer to the power module compared to the second condenser means.

15. The apparatus of claim 11, wherein a resistance of the first wiring means is greater than a resistance of the second wiring means.

16. The apparatus of claim 11, wherein a synthetic impedance at a resonance frequency of the first and second condenser means is smaller than a synthetic impedance at a carrier frequency of the power module.

17. The apparatus of claim 11, wherein a ratio of an electrostatic capacity of the first condenser means to an electrostatic capacity of the second condenser means is substantially equal to a ratio of the an inner inductance plus a wiring inductance of the second condenser means to an inner inductance plus a wiring inductance of the first condenser means.

* * * * *